United States Patent

Obayashi et al.

Patent Number: 5,882,422
Date of Patent: Mar. 16, 1999

[54] METHOD FOR REMOVING CLOGGING DUST IN HONEYCOMB CATALYST

[75] Inventors: Yoshiaki Obayashi; Kozo Iida; Kazuo Ideue; Mitsunori Ooizumi, all of Hiroshima; Osamu Naito, Nagasaki, all of Japan

[73] Assignee: Mitsubishi Heavy Industries, Ltd., Tokyo, Japan

[21] Appl. No.: 873,380

[22] Filed: Jun. 12, 1997

[30] Foreign Application Priority Data

Jun. 13, 1996 [JP] Japan ................................ 8-152318

[51] Int. Cl.⁶ ................................ B08B 3/12; B08B 5/04
[52] U.S. Cl. ................................ 134/1; 134/21; 134/22.1; 134/22.18
[58] Field of Search ................................ 134/1, 21, 22.1, 134/22.4, 22.12, 22.18, 25.4, 37; 502/5

[56] References Cited

U.S. PATENT DOCUMENTS

| | | | |
|---|---|---|---|
| 4,086,184 | 4/1978 | Henry et al. | 502/5 |
| 4,864,821 | 9/1989 | Hoch | 60/274 |
| 4,931,104 | 6/1990 | Burk | 134/21 |
| 4,992,614 | 2/1991 | Rodewald | 134/1 |
| 5,127,960 | 7/1992 | Dittrich et al. | 134/21 |
| 5,132,270 | 7/1992 | Wachholz et al. | 502/5 |
| 5,240,507 | 8/1993 | Gary et al. | 134/21 |
| 5,332,023 | 7/1994 | Mills | 134/21 X |
| 5,401,324 | 3/1995 | Huddas | 134/21 |
| 5,441,574 | 8/1995 | Hansen et al. | 134/22.1 |

FOREIGN PATENT DOCUMENTS

| | | |
|---|---|---|
| 0 472 853 | 3/1992 | European Pat. Off. . |
| 40 33 797 | 4/1992 | Germany . |
| 44 09 625 | 9/1995 | Germany . |

*Primary Examiner*—Jill Warden
*Assistant Examiner*—Saeed Chaudhry
*Attorney, Agent, or Firm*—Michael N. Meller

[57] ABSTRACT

The present invention relates to a method for removing clogging dust in gas passing holes in a honeycomb catalyst. A honeycomb catalyst whose gas passing holes are clogged with dust in exhaust gas is immersed in water in a vessel, and then the vessel is closed and vacuum suction is exerted, by which water is allowed to flow in the gas passing holes in the honeycomb catalyst to remove dust in the gas passing holes.

4 Claims, 2 Drawing Sheets

METHOD FOR REMOVING CLOGGING DUST IN HONEYCOMB CATALYST

FIELD OF THE INVENTION AND RELATED ART STATEMENT

The present invention relates to a method for removing clogging dust in gas passing holes in a honeycomb catalyst.

When dust is contained in a combustion exhaust gas, a catalyst shape such as honeycomb, cylindrical, and plate shapes is prevailingly used as a parallel flow to prevent a catalytic reactor from being clogged with dust. In particular, a honeycomb catalyst having a square gas passing hole shape, which is economical because of its large gas contact area, is often used. The honeycomb-shaped catalyst practically used now is used in large amounts as a catalyst for removing nitrogen oxides (hereinafter abbreviated to $NO_x$) in combustion exhaust gas.

OBJECT AND SUMMARY OF THE INVENTION

The honeycomb-shaped catalyst is used to remove $NO_x$ in combustion exhaust gas from a coal firing boiler. For the honeycomb-shaped catalyst, there are places where the gas flow velocity is low and places where dust accumulates for a structural reason of catalytic reactor, and dust (fly ash) contained in exhaust gas covers the gas passing holes of the catalyst. Therefore, the gas passing holes of the catalyst are completely clogged with dust. Since gas does not flow through the clogged holes, the catalyst surface area in contact with gas decreases, so that the $NO_x$ removing performance as the whole system is degraded.

Accordingly, it is necessary to replace the clogged catalyst or remove dust from the clogged catalyst in order to keep a high $NO_x$ removing performance. However, the replacement of catalyst with a new catalyst requires a high cost of catalyst and a cost for throwing away the used catalyst, which imposes an economic burden.

An object of the present invention is to provide a method for removing dust clogging in the gas passing holes of a honeycomb catalyst by simple means, which is used especially as a catalyst for removing $NO_x$ in coal firing boiler exhaust gas.

The dust in a honeycomb catalyst, which is used as a catalyst for removing $NO_x$ in coal firing boiler exhaust gas and whose gas passing holes are clogged, is mainly fly ash. The principal components thereof are silicon (Si), aluminum (Al), iron (Fe), calcium (Ca), etc. The compounds are silicon oxide ($SiO_2$), aluminum oxide ($Al_2O_3$), calcium oxide (CaO), and mullite ($3Al_2O_3.2SiO_2$). It was thought that the bonding force between individual particles of dust is weak and these particles are easily washed away by water, so that the honeycomb catalyst was immersed in water. As the result, clogging dust could not be removed completely though a dust removing effect was achieved to some degree. The condition of remaining dust was observed, and it was found that the dust was dense and relatively hard, and also in a dry state despite the fact that the honeycomb catalyst was immersed in water.

It was thought that in order to remove clogging dust, it is necessary to wet the dust with water, so that the honeycomb catalyst was immersed in water and a vessel in which the honeycomb catalyst had been immersed was vacuum sucked. As the result, it was verified that even in the gas passing holes in the honeycomb catalyst clogged densely with dust, the whole hole from the upstream end to the downstream end in the gas flow direction could be soaked with water, and the dust could be wetted, so that the dust could be removed completely. Also, it was verified that after vacuum suction was exerted to wet dust with water, the honeycomb catalyst or the water in the vessel was vibrated, by which the dust removing effect was increased and dust could be removed in a short period of time. Further, it was verified that as vibrating means, it was effective to mechanically hit the vessel in which the honeycomb catalyst was immersed, or to vibrate the water or honeycomb catalyst by ultrasonic waves or underwater discharge impulse waves.

The present invention was completed on the basis of the above knowledge, and accordingly the present invention provides a method for removing clogging dust in a honeycomb catalyst comprising the steps of immersing a honeycomb catalyst whose gas passing holes are clogged with dust in exhaust gas in water in a vessel, closing the vessel, and exerting vacuum suction, by which water is allowed to flow in the gas passing holes in the honeycomb catalyst to remove dust in the gas passing holes.

According to the present invention, a honeycomb catalyst whose gas passing holes are clogged with dust in exhaust gas is immersed in water in a vessel, and the vessel in which the honeycomb catalyst is immersed is vacuum sucked. Even in a condition that the whole gas passing hole from the upstream end to the downstream end in the gas flow direction of catalyst is densely clogged with dust, the whole hole in the gas flow direction of honeycomb catalyst can be soaked with water. Thereupon, the dust is decomposed into fine particles, and allowed to settle naturally. Specifically, when there is a void between the clogging dust particles, the dust particles is decomposed into fine particles by the infiltration of water and the rise of air bubbles. Fine particles with a large diameter is allowed to settle naturally, and those with a small diameter is discharged from the upper end together with air bubbles, by which the dust is removed.

By making the interior of vessel a vacuum, the gas existing in voids between dust particles or in voids between dust lumps is discharged into water as air bubbles. Then, water infiltrates into the voids, and the dust lumps are wetted by water, so that the bonding force between dust particles becomes weak. Therefore, the portion that water enters is broken as if a mud pie is dipped in water, and the dust lump is decomposed into individual dust particles, so that the dust particles are discharged through the gas passing holes in the catalyst together with air bubbles produced in succession.

Also, by vibrating the honeycomb catalyst or water by using underwater discharge, ultrasonic waves, etc., the above-mentioned effect can be increased, and clogging dust can be removed in a short period of time.

DETAILED DESCRIPTION OF PREFERRED EMBODIMENTS

WORKING EXAMPLE 1

Figure 1:
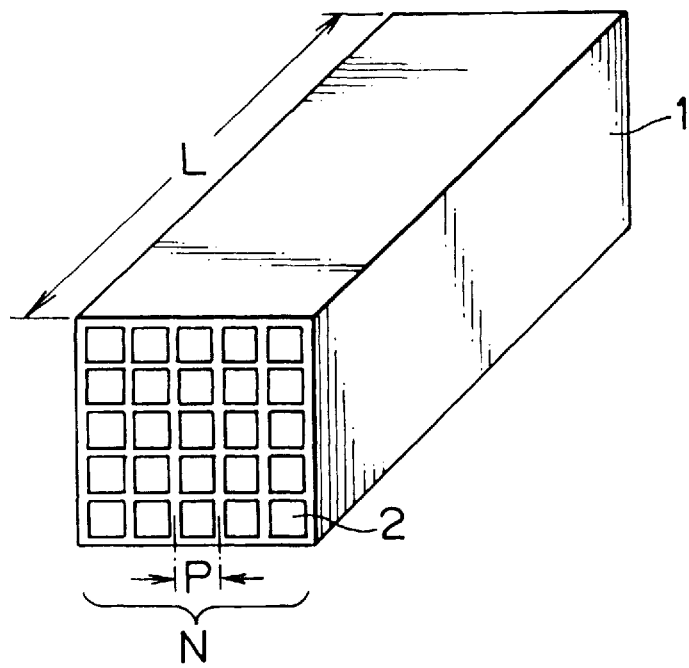
FIG. 1 is a perspective view of a honeycomb-shaped $NO_x$ removing catalyst, which is used in working examples of the present invention.
Figure 2:
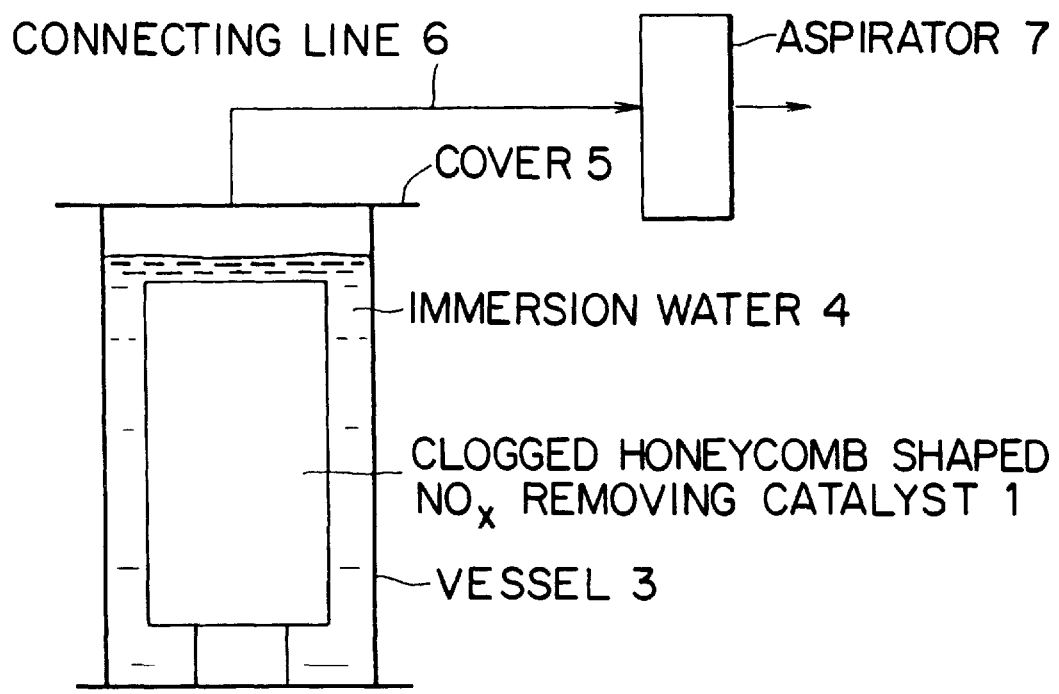
FIG. 2 is a view for illustrating a dust removing apparatus used for working examples 1 and 2 of the present invention.

FIG. 1 shows a honeycomb-shaped $NO_x$ removing catalyst ($TiO_2$: 89.0 wt %, $WO_3$: 10.4 wt %, $V_2O_5$: 0.6 wt %) which has been used in exhaust gas of plants A and B of a coal firing boiler for about 45,000 hours. As shown in FIG. 1, the honeycomb-shaped $NO_x$ removing catalyst is provided with gas passing holes 2. The honeycomb-shaped $NO_x$ removing catalyst 1 measures 150 mm (height)×150 mm (width)×800 mm (length L), and the hole pitch P thereof is 7.4 mm and the number N of holes is 20×20. A dust removal test was made with a honeycomb-shaped $NO_x$ removing catalyst 1 whose gas passing holes 2 are clogged by using clogging dust removal test equipment shown in FIG. 2. FIG. 2 shows a clogged honeycomb-shaped $NO_x$ removing catalyst 1, a vessel 3, immersion water 4, a cover 5, a connecting line 6, and an aspirator 7.

The clogged honeycomb-shaped $NO_x$ removing catalyst 1 was put into the vessel 3, which had been filled with immersion water 4, the cover 5 of the vessel 3 was closed, the vessel 3 was connected to the aspirator 7, and the aspirator 7 was operated for 30 minutes to exert suction. Thereafter, the aspirator 7 was stopped, the connecting line 6 was disconnected from the vessel 3, and the interior of the vessel 3 was made at atmospheric pressure. Then, the honeycomb-shaped $NO_x$ removing catalyst 1 was removed from the vessel 3 to measure the number of clogged gas passing holes 2 of the catalyst 1. The measurement result is given in Table 1 below.

Comparative Example 1

A dust removal test was made in the same manner as with the case of working example 1 except that vacuum suction was omitted. Specifically, a honeycomb-shaped $NO_x$ removing catalyst 1, which had been used in exhaust gas of plants A and B of the same coal firing boiler as that of working example 1 for about 45,000 hours, was put into a vessel 3, which had been filled with immersion water 4, and immersed for 30 minutes. Then, the honeycomb-shaped $NO_x$ removing catalyst 1 was removed from the vessel 3 to measure the number of clogged gas passing holes 2 of the catalyst 1. The measurement result is also given in Table 1.

Working example 1 achieves a great dust removing effect as compared with comparative example 1. In working example 1, clogging dust in the catalysts used in plant A could be removed completely. In the catalysts used in plant B, however, dust could not be removed completely though 90% or more dust could be removed.

TABLE 1

Test Result

Number of gas passing holes clogged with dust

| | | Working example 1 | | Comparative example 1 | |
|---|---|---|---|---|---|
| Plant | Sample | Before test | After test | Before test | After test |
| A | a | 221 | 0 | — | — |
| | b | 206 | 0 | — | — |
| | c | 167 | 0 | — | — |
| | d | — | — | 213 | 62 |
| | e | — | — | 236 | 71 |
| | f | — | — | 152 | 48 |
| B | g | 320 | 21 | — | — |
| | h | 371 | 13 | — | — |
| | i | 297 | 12 | — | — |
| | j | — | — | 306 | 132 |
| | k | — | — | 371 | 158 |
| | l | — | — | 173 | 68 |

WORKING EXAMPLE 2

A dust removal test was made again with the honeycomb-shaped $NO_x$ removing catalysts 1, which had been used in working example 1 and whose dust could not be removed completely in working example 1, in the same manner as working example 1. The test result is given in Table 2 below.

Comparative Example 2

Like working example 2, a dust removal test was made again with the honeycomb-shaped $NO_x$ removing catalysts 1 used in comparative example 1 in the same manner as comparative example 1. The test result is also given in Table 2.

The test result indicates that clogging dust in the catalysts used in plant B could also be removed completely in working example 2, and the effect of working example 2 is very great as compared with comparative example 2. Therefore, although the condition of clogging dust differs in each plants and the difficulty in removing dust differs, clogging dust in the catalysts used in any plant can be removed completely by repeating working example 1.

TABLE 2

Test Result

Number of gas passing holes clogged with dust

| | | Working example 2 | | Comparative example 2 | |
|---|---|---|---|---|---|
| Plant | Sample | Before test | After test | Before test | After test |
| B | g | 21 | 0 | — | — |
| | h | 13 | 0 | — | — |
| | i | 12 | 0 | — | — |
| | j | — | — | 132 | 116 |
| | k | — | — | 158 | 130 |
| | l | — | — | 68 | 54 |

WORKING EXAMPLE 3

Figure 3:
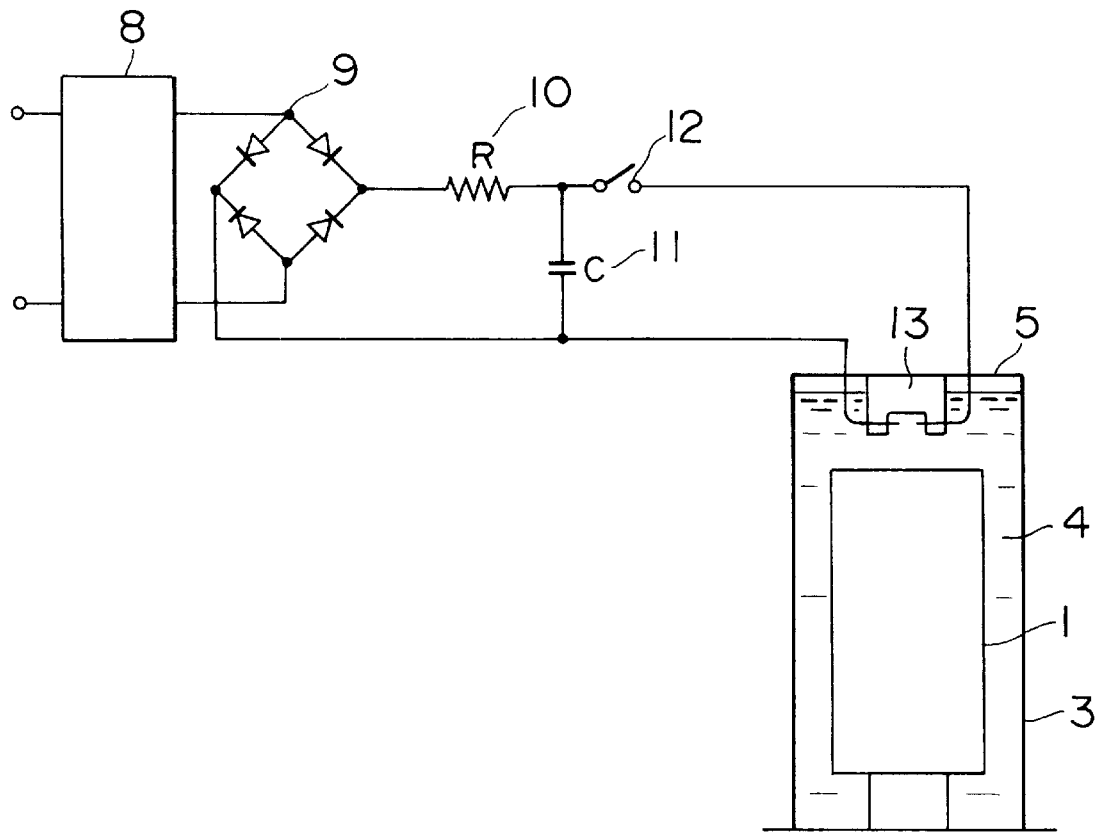
FIG. 3 is a view for illustrating a dust removing apparatus used for working example 3 of the present invention.

A dust removal test was made with catalysts taken out of plant B in which dust removal was relatively difficult to do, of the honeycomb-shaped $NO_x$ removing catalysts 1 used in working example 1, by using a clogging dust removing apparatus shown in FIG. 3. In FIG. 3, the same reference numerals are applied to the same elements as those of FIG. 1, and the explanation of the elements is omitted. Besides the elements of FIG. 1, FIG. 3 shows a high voltage transformer 8, a rectifier 9, a resistor 10, a capacitor 11, a switch 12, and an electrode 13.

Like working example 1, a honeycomb-shaped $NO_x$ removing catalyst 1 was put into the vessel 3, and the aspirator 7 (not shown in FIG. 3) was operated for 30 minutes to exert vacuum suction. The electrode 13 was put into the vessel 3, a high d.c. voltage was developed by the high voltage transformer 8, rectifier 9, resistor 10, and capacitor 11, the switch 12 was turned on/off, and underwater discharge was allowed to occur for five minutes at the electrode 13 portion to generate impulse waves. The honeycomb-shaped $NO_x$ removing catalyst 1 was vibrated by the impulse waves to accelerate the removal of clogging dust. After the completion of the test, the catalyst 1 was removed from the vessel 3 to measure the number of clogged gas passing holes 2 of the catalyst 1. The test result is given in Table 3 below.

The test result indicated that dust can be removed completely in working example 3 as well, and dust can be removed in a shorter period of time than in working example 2.

TABLE 3

Test Result

Number of gas passing holes clogged with dust
Working example

| Plant | Sample | Before test | After test |
|---|---|---|---|
| B | m | 323 | 0 |
|   | n | 378 | 0 |
|   | o | 216 | 0 |

TABLE 4

Test Result

Number of gas passing holes clogged with dust
Working example

| Plant | Sample | Before test | After test |
|---|---|---|---|
| B | p | 310 | 0 |
|   | q | 356 | 0 |
|   | r | 187 | 0 |

WORKING EXAMPLE 4

Figure 4:
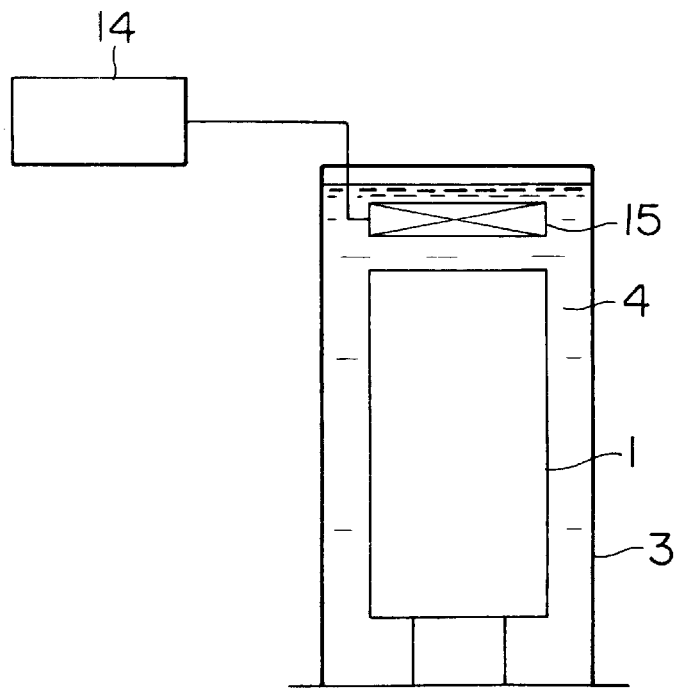
FIG. 4 is a view for illustrating a dust removing apparatus used for working example 4 of the present invention.

A dust removal test was made with honeycomb-shaped $NO_x$ removing catalysts 1 taken out of plant B in which dust removal was relatively difficult to do, of the catalysts used in working example 1, by using a clogging dust removing apparatus shown in FIG. 4. In FIG. 4, the same reference numerals are applied to the same elements as those of FIG. 1, and the explanation of the elements is omitted. Besides the elements of FIG. 1, FIG. 4 shows an ultrasonic power supply 14 and an ultrasonic vibrator 15.

Like working example 1, a honeycomb-shaped $NO_x$ removing catalyst 1 was put into the vessel 3, and the aspirator 7 (not shown in FIG. 4) was operated for 30 minutes to exert vacuum suction. The ultrasonic vibrator 15 was put into the vessel, power was supplied by the ultrasonic power supply 14, and cavitation was produced so that water was vibrated by the impulse waves to accelerate the removal of clogging dust. After the completion of the test, the catalyst 1 was removed from the vessel 3 to measure the number of clogged gas passing holes 2 of the catalyst 1. The test result is given in Table 4.

The test result indicated that dust can be removed completely in working example 4 as well, and dust can be removed in a shorter period of time than in working example 2.

The method for removing clogging dust in a honeycomb catalyst in accordance with the present invention can remove clogging dust in a very short period of time regardless of the condition (denseness or hardness) of clogging dust caused by the difference between plants in which the catalyst is used. In particular, this method is effective as a method for removing clogging dust in catalysts for removing $NO_x$ in the exhaust gas of coal firing boilers which mainly use a honeycomb-shaped catalyst.

We claim:

1. A method for removing clogging dust in a honeycomb catalyst comprising the steps of immersing a honeycomb catalyst whose gas passing holes are clogged with dust in exhaust gas in water in a vessel, closing said vessel, and exerting vacuum suction to said vessel, by which water is allowed to flow in said gas passing holes in said honeycomb catalyst to remove dust in said gas passing holes.

2. A method for removing clogging dust in a honeycomb catalyst according to claim 1, comprising the step of vibrating said honeycomb catalyst or water in said vessel.

3. A method for removing clogging dust in a honeycomb catalyst according to claim 1, comprising the steps of disposing an electrode for underwater discharge device in water in said vessel and generating impulse waves by underwater discharge, by which said honeycomb catalyst is vibrated by the impulse waves to accelerate the removal of clogging dust in said gas passing holes.

4. A method for removing clogging dust in a honeycomb catalyst according to claim 1, comprising the steps of disposing an ultrasonic vibrator of an ultrasonic wave generating device in water in said vessel and producing cavitation by ultrasonic vibration, by which said honeycomb catalyst is vibrated by the impulse waves to accelerate the removal of clogging dust in said gas passing holes.

* * * * *